United States Patent

[11] 3,604,982

| [72] | Inventor | Thomas M. McDonald<br>Monroe, Conn. |
|------|----------|-----|
| [21] | Appl. No. | 798,956 |
| [22] | Filed | Feb. 13, 9169 |
| [45] | Patented | Sept. 14, 1971 |
| [73] | Assignee | Hubbell Harvey Incorporated<br>Bridgeport, Conn. |

[54] GROUND FAULT AND OVERLOAD CURRENT INTERRUPTING APPARATUS
9 Claims, 4 Drawing Figs.

[52] U.S. Cl..................................... 317/18 R,
317/27 R, 317/46
[51] Int. Cl...................................... H02h 3/16
[50] Field of Search............................ 317/18, 27, 46, 52

[56] References Cited
UNITED STATES PATENTS

| 3,213,321 | 10/1965 | Dalziel .................. | 317/18 |
| 3,376,477 | 4/1968 | Weinger ................ | 317/27 |
| 3,440,580 | 4/1969 | Molenaar ............... | 335/18 |
| 3,473,091 | 10/1969 | Morris et al. ......... | 317/18 |
| 3,525,903 | 8/1970 | Morris et al. ......... | 317/41 X |

Primary Examiner—J. D. Miller
Assistant Examiner—Harry E. Moose, Jr.
Attorney—Wooster, Davis and Cifelli ABSTRACT: A unit which combines the features of electrical overload and ground fault protection. A single circuit breaker includes overload tripping coils and a shunt coil which is energized by the output of a differential transformer. In one form, the unit is designed to operate in a three-wire, grounded neutral system. The shunt coil is operable from both line conductors so that operation from a two-wire supply is possible without modification.

INVENTOR
Thomas M. McDonald
BY
Wooster, Davis & Cifelli
ATTORNEYS

GROUND FAULT AND OVERLOAD CURRENT INTERRUPTING APPARATUS

BACKGROUND OF THE INVENTION

The protection of individuals from electrical shock has always been of great concern to the public, to safety authorities, and to the electrical industry. Until recently, however, good protection has seldom been achieved. One reason has been that the amount of current required to produce serious, and even fatal, shock is quite small as compared to currents that might cause damage to the electrical equipment. Protection against the latter is provided by fuses or overload circuit breakers. However, these are quite inadequate to protect against shock.

Recently, there has been introduced a new class of protective equipment known as Ground Fault Current Interrupters. These interrupters normally include a differential transformer having a core which carries a primary winding in series with each line and neutral conductor supplying a load. In the absence of an extraneous circuit to ground, the currents in the two conductors are equal and opposite and the primary windings induce equal and opposite magnetic flux in the core. These cancel so the net flux in the core is zero. However, should an extraneous leakage path leakage path to ground occur as, for example, through an individual touching one of the line conductors, the currents in the primary touching one of the line conductors, the currents in the primary windings become unbalanced producing a magnetic flux in the transformer core. This flux is detected by a secondary winding which actuates a tripping circuit and opens the power supply.

Under many circumstances, the type of power supply may not be fully within the control of the user of such devices. Boats, for example, are often wired for 110/220-volt single-phase service. However, the marina or other facility furnishing electrical power may have only 110-volt service. Thus it would be desirable to provide a ground fault current interrupter which is adapted for use with either 110/220-volt service or with 110-volt service without requiring modification by the user.

Another difficulty with prior art devices is that they are separate from the normal overcurrent protectors and thus require duplication of circuit breakers. Furthermore, it would be desirable to supply a device which is compact in size and could be installed with a minimum change in panelboard wiring.

Accordingly, it is an object of the present invention to provide a ground fault current interrupter device which is operable from either a two-wire or a three-wire grounded neutral supply.

Other objects are to provide such a device which combines the functions of a ground fault current interrupter and an overload current interrupter, and which is compact and easily installed.

Other objects, features and advantages will be apparent from the following description, the drawings, and the appended claims.

SUMMARY OF THE INVENTION

Ground fault and overload current interrupting apparatus includes a differential transformer with at least two primary windings connected in the conductors supplying a load, and a secondary winding. A circuit breaker is in series between the primary windings and the load and includes an overload coil in series with the load and a shunt coil. A reed switch is connected i series with the shunt coil between the line and neutral conductors and its actuating coil is connected across the secondary winding.

BRIEF DESCRIPTION OF THE DRAWINGS

The construction and operation of this invention may be best understood by reference to the drawings wherein.

DESCRIPTION OF THE PREFERRED EMBODIMENT

Figure 1:
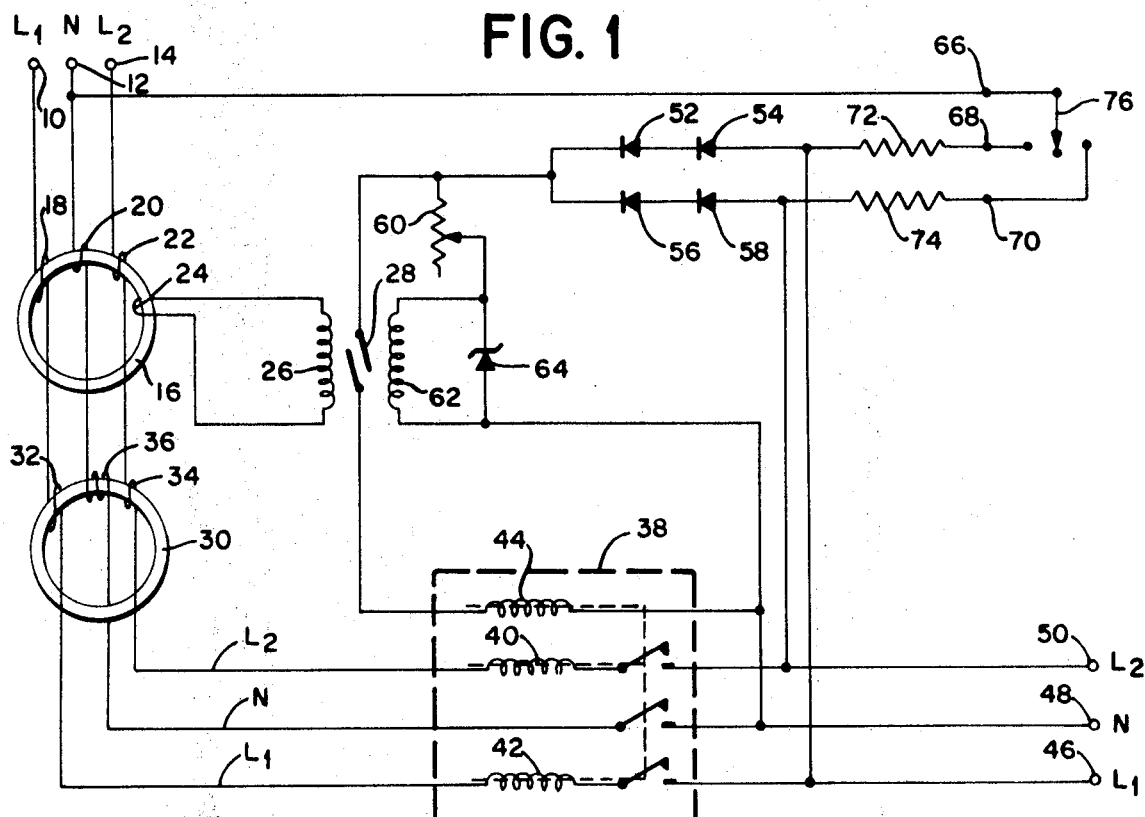
FIG. 1 is a circuit diagram of a ground fault and overload current interrupting apparatus in accordance with the invention.

FIG. 1 illustrates a circuit for a device useable with a 110/220-volt power supply. Accordingly, it is provided with three input terminals 10, 12 14 which are connectable, respectively, to line one, grounded neutral, and line two of the power supply. The conductors associated with each terminal are designated $L_1$, N, and $L_2$. A differential transformer comprises a toroidal magnetic core 16 provided with three two-turn primary windings 18, 20, 22, each being in series with one of the conductors $L_1$, N, and $L_2$. A one-turn secondary winding 24 on the same core is connected to the 150-turn actuating coil 26 of reed switch 28.

In order to make the apparatus of the invention insensitive to the presence of accidental grounds in the neutral circuit, there is provided a second toroidal magnetic core 30 which has two-turn windings 32, 34 connected in series respectively, with conductors $L_1$, $L_2$, and a three-turn winding 36 connected in series with a neutral conductor. This may be termed a "buffer" transformer and its function and operation are described in detail in the copending application of Alton Ray Morris and Thomas Michael McDonald, Ser. No. 630,932, filed Apr. 14, 1967, U.S Pat. No. 3,474,091 entitled Ground Control Leakage Differential Protective Apparatus, and assigned to the same assignee as the present invention. Also in series with the differential transformer and buffer transformer in conductors $L_1$, N, $L_2$ is a three-pole circuit breaker 38 which includes overload coils 40, 42 in the two line conductors and a shunt coil 44. The circuit breaker, in turn, is connected to output terminals 46, 48, 50. The front of the circuit breaker is provided with the usual mounting holes 51.

The shunt coil 44 of circuit breaker 38 is connected in series with reed switch 28 between the neutral conductor N and either of line conductors $L_1$ and $L_2$. This is accomplished by a pair of branch circuits having a total of four 1N4004 diodes. Diodes 52, 54 are connected to conductor $L_1$ while diodes 56, 58 are connected to conductor $L_2$. The diodes are polarized in the same direction and, accordingly, when both $L_1$ and $L_2$ are energized, they function as a full-wave rectifier, permitting current to flow through reed switch 28 during both cycles of the alternating current supply. If either of conductors $L_1$ or $L_2$ is not energized, two of the diodes become inactive but the remaining two will still function as a half-wave rectifier to supply tripping current through reed switch 28. It will be obvious to those skilled in the art that each pair of diodes could be replaced by a single diode. However, the use of two diodes in series provides an extra margin of safety in the event of failure of one diode of the pair.

In addition to supplying current to reed switch 28, the diodes also supply direct current to a series circuit comprising 0–15,000 ohms potentiometer 60 and a 3,000-turn biasing coil 62. Coil 62 is also positioned in the vicinity of reed switch 28 and its magnetic field is in such a direction as to tend to close reed switch 28. The strength of the field produced by coil 62 alone is insufficient to close the reed switch but "biases" it and increases its sensitivity. Excessive voltages across biasing coil 62 are prevented by an avalanche diode 64 which has a forward voltage drop of 0.6 volt and a reverse breakdown voltage of 5.6 volts. The potentiometer 60 serves to adjust the current through biasing coil 62 and allows the sensitivity of reed switch 28 to be selectively adjustable. Three test switch terminals 66, 68, 70 are also provided, terminal 66 being connected to the neutral input terminal 12 and terminals 68, 70 being connected to the output line terminals 46, 50 by 2,700- ohm resistors 72, 74. A momentary three-position test switch 76 may be connected to these terminals as illustrated and permits either of resistors 72, 74 to be connected to bypass differential transformer 16 to test the operation of the device. these terminals as illustrated and permits either of resistors 72, 74 to be connected to bypass differential transformer 16 to test the operation of the device.

During normal operation, with a load connected to the output terminals, the currents through the three main conductors $L_1$, $L_2$, N are balanced and no net flux is produced in core 16. Assume, however, that an extraneous ground path occurs which bypasses core 16. This might be caused, for example, by a grounded person touching either of conductors $L_1$, $L_2$ in the vicinity of the load being protected. When this happens, the currents through the three conductors become unbalanced and a net flux appears in core 16 which induces a voltage in secondary winding 24. Current then flows through actuating coil 26 and its field adds to that produced by biasing coil 62, thus closing reed switch 28. Current then flows from the appropriate diodes 52, 54, or 56, 58 through the reed switch 28 and shunt coil 44, tripping circuit breaker 38 to its open position and deenergizing output terminals 46, 48, 50.

Assume that the only power supply available is 110 volts. This would be connected across either terminals 10, 12 or 12, 14. The corresponding output terminals 46, 48 or 48, 50 would be connected to the load. (In practice, the unit would probably be wired into the boat's power supply panel and the output terminals would be more or less permanently wired. Also, the input terminals would be connected through a switch to either the boat's generator or to a dockside connector). The unit would still function properly. Upon an unbalance, the reed switch 28 would close and power to coil 44 would be provided through the diode pair 52, 54 or 56, 58 connected to the energized line.

It will also be obvious to those skilled in the art that the overload coils 40, 42 of relay 38 remain fully operable at all times. Thus, there is provided in one unit both overload and ground leakage protection.

Figure 2:
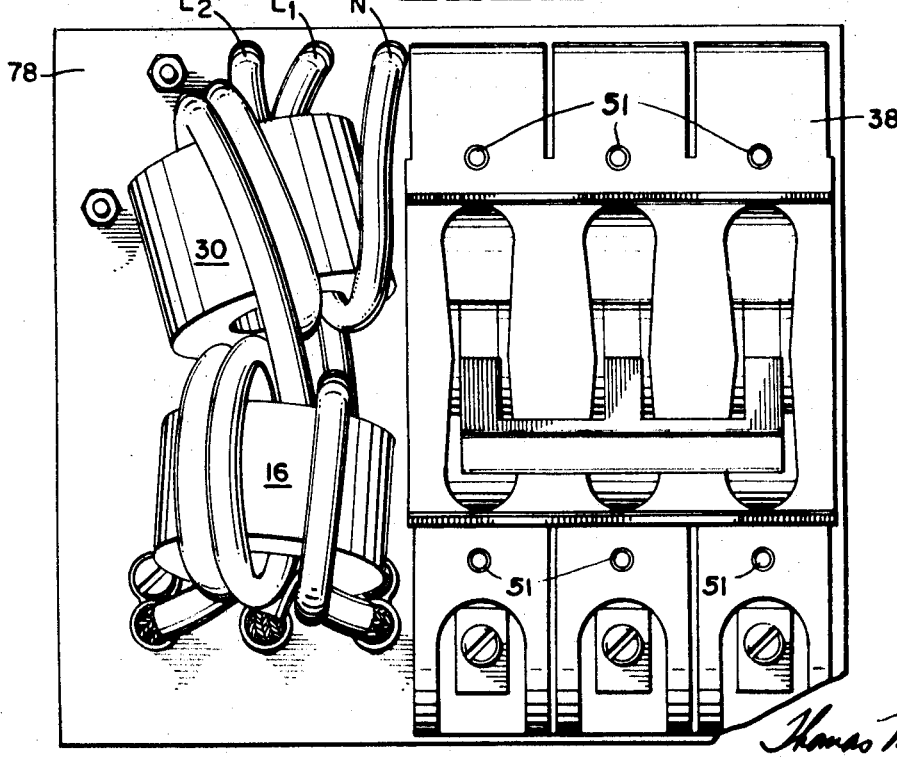
FIG. 2 is a front view of a device incorporating the invention.
Figure 3:
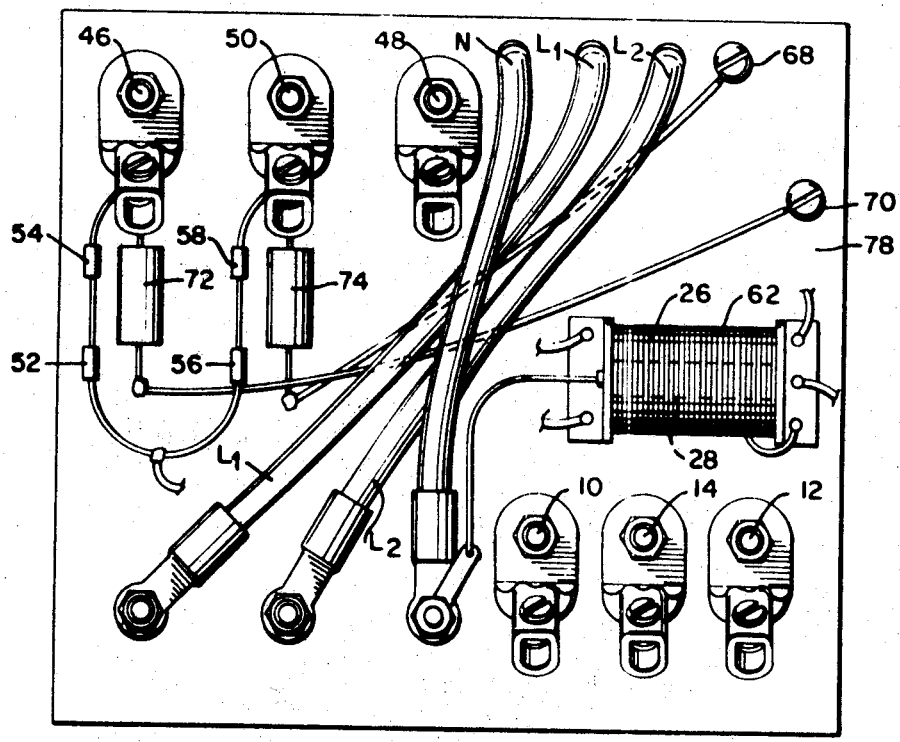
FIG. 3 is a back view of the device of FIG. 2.

The compact nature of apparatus constructed in accordance with thin invention may be best seen by reference to FIGS. 2 and 3. These figures are intended to illustrate the physical appearance of the unit. Accordingly, some of the electrical components and much of the wiring is omitted for ease of explanation. The illustrated unit comprises a single mounting board 78, upon the front of which is mounted the circuit breaker 38. Also on the front surface, and adjacent the circuit breaker, are the toroidal cores 16, 30. These cores and their windings extend no further from mounting board 78 than the front surface portion of circuit breaker 38 which includes mounting holes 51. The remaining components are mounted on the rear of the board as shown in FIG. 3, the coils 26, 62 being on a common support encircling reed switch 28. The ease with which the apparatus of this invention may be wired into a power supply will be apparent. It will be noted, for example, that output terminals 46, 48, 50 are terminals of circuit breaker 38 while input terminals 10, 12, 14 are very slightly displaced from the circuit breaker terminals. This permits the unit to be easily wired into an existing system, merely substituting it for the existing circuit breaker. The same panel board cutout and mounting holes which are employed with a standard circuit breaker are used for this unit. After installation, the cores 16, 30 occupy the space between the panel board and mounting board 78. It will also be noted that this unit retains the current overload protection of a standard circuit breaker but adds thereto the differential tripping feature of a ground fault current interrupter. Another advantage of the apparatus of this invention is that no separate DC power supply is required, thus eliminating the need for the usual transformer. Furthermore, the use of toroids in place of laminated transformer cores minimizes interference from outside magnetic fields.

Figure 4:
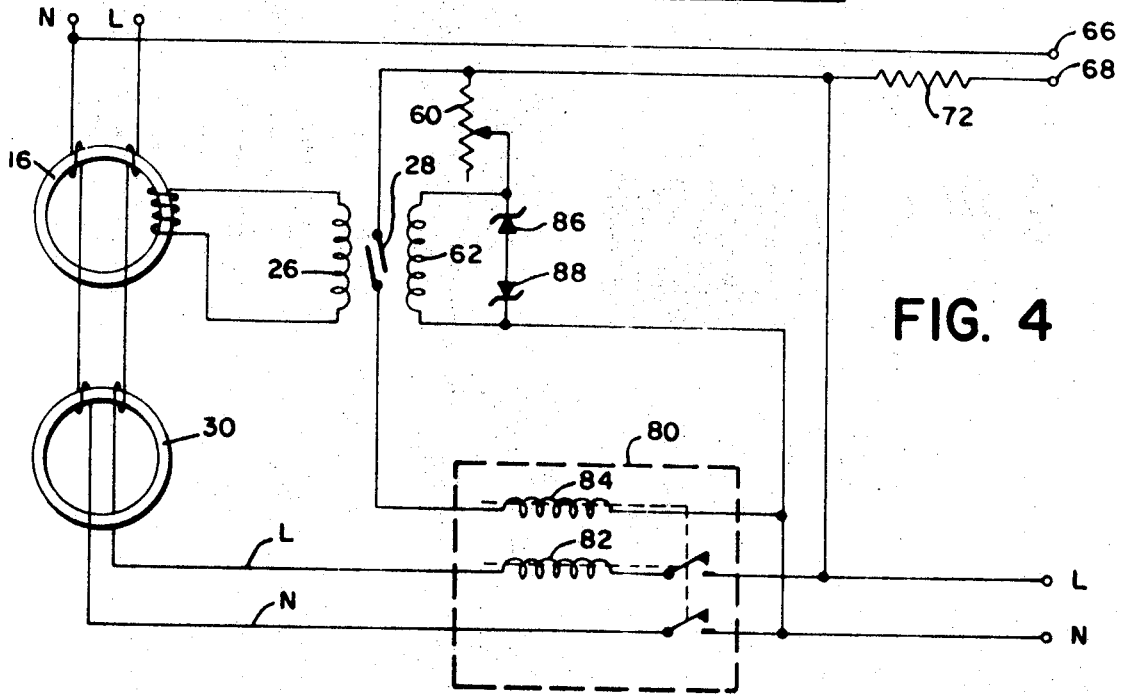
FIG. 4 is a circuit diagram of a modified form of the invention.

The apparatus so far described is designed for operation on a 110/220-volt system. However, it will be apparent that the features of this invention may also be adapted to an apparatus solely for 110-volt applications. The circuit of such an apparatus is illustrated in FIG. 4. This circuit is quite similar to that previously described although simplified in some respects. Thus, a complete description is not required. Elements similar to those previously described are given similar reference numerals. In this modification, a two-pole circuit breaker 80 is employed having an overload coil 82 and a shunt coil 84, the latter being in series with the reed switch 28. The diodes required in the earlier described circuit are omitted and, in place of a single avalanche diode across biasing coil 62, two such diodes 86, 88 are provided in series to protect the coil against voltage surges.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. Ground fault and overload current interrupting apparatus for use with either two or three wire electrical systems without any circuit modification comprising: a differential transformer having at least three primary windings connected in series, respectively, with first and second line conductors and a neutral conductor supplying a load, and a secondary winding; a circuit breaker in series between said primary windings and said load and including overload coils in series with said first and second line conductors and said load, and a shunt coil; a reed switch in series with said shunt coil between both of said first and second line conductors and said neutral conductor; a reed switch actuating coil connected across said secondary winding and a reed switch biasing coil connected between said first and second line conductors and said neutral conductor; and full-wave rectifier means connecting both said reed switch and said biasing coil to both said first and second line conductors for supplying current thereto even if one of said first and second line conductors is deenergized.

2. The apparatus of claim 1 wherein said differential transformer, circuit breaker, reed switch, reed switch actuating coil, biasing coil and rectifier means are mounted on a common base for mounting as a single unit on a conventional panel board.

3. The apparatus of claim 2 including line and load terminals integral therewith.

4. The apparatus of claim 2 wherein said circuit breaker defines conventionally positioned mounting holes for connection to said panel board.

5. The apparatus of claim further comprising a potentiometer means connected in series with said biasing coil across said line and neutral conductors for selectively adjusting the sensitivity of said reed switch.

6. The apparatus of claim 1 wherein a toroidal buffer transformer is connected in series with said differential transformer and said circuit breaker.

7. Ground fault current interrupting apparatus for use on either a two-wire or a three-wire, grounded neutral, single-phase supply without requiring any circuit modification when changing from one supply to the other which comprises: a differential transformer having a primary winding in series with each of the line and neutral conductors supplying a load and a secondary winding; a circuit breaker in series between said primary windings and said load including a tripping coil; switch means closeable in response to a voltage output from said secondary winding; and means connecting said switch means and tripping coil in series between said neutral conductor and both of said line conductors for supplying current thereto even if one of said said line conductors is deenergized.

8. The apparatus of claim 7 wherein said connecting means includes a rectifier circuit across said line conductors.

9. The apparatus of claim 4 wherein said differential transformer is positioned on said base alongside said circuit breaker so as to occupy the space between said base and panel board.

PO-1050
(5/69)

UNITED STATES PATENT OFFICE
CERTIFICATE OF CORRECTION

Patent No. 3,604,982          Dated  September 14, 1971

Inventor(s) Thomas M. McDonald

It is certified that error appears in the above-identified patent and that said Letters Patent are hereby corrected as shown below:

Column 1, line 26, delete "leakage path", second occurrence, as it appears twice in the printing.

See specification, page 2, line 1, as filed.

Column 1, lines 28 and 29, delete "touching one of the line conductors, the currents in the primary", as it appears twice in the printing.

See specification, page 2, lines 2 and 3, as filed.

Column 1, line 68, "i" should be --in--, before "series".

See specification, page 3, line 8, as filed.

Column 2, line 14, a comma (,) should be inserted after "12".

See specification, page 3, line 25, as filed.

Column 3, lines 5, 6, and 7, delete "these terminals as illustrated and permits either of resistors 72, 74 to be connected to bypass differential transformer 16 to test the operation of the device,", as it appears twice in the printing.

See specification, page 5, lines 27 to 30, as filed.

Column 3, line 40, "thin" should be --this--.

See specification, page 7, line 2, as filed.

Column 4, line 49, (Claim 5) after "claim" insert --1--.

See amendment dated August 13, 1970, page 2, claim 13, line 1.

Signed and sealed this 28th day of November 1972.

(SEAL)
Attest:

EDWARD M. FLETCHER, JR.                ROBERT GOTTSCHALK
Attesting Officer                      Commissioner of Patents